Dec. 15, 1936.  F. B. BELL  2,064,404
MOUNTING FOR VEHICLE WHEELS
Filed Jan. 30, 1935  6 Sheets-Sheet 1

INVENTOR
Frank B. Bell

Dec. 15, 1936. F. B. BELL 2,064,404
MOUNTING FOR VEHICLE WHEELS
Filed Jan. 30, 1935 6 Sheets-Sheet 3

INVENTOR
Frank B. Bell

Dec. 15, 1936.   F. B. BELL   2,064,404
MOUNTING FOR VEHICLE WHEELS
Filed Jan. 30, 1935   6 Sheets-Sheet 5

MOVEMENT OF WHEEL SUPPORT
RELATIVE TO VEHICLE FRAME

Dec. 15, 1936.   F. B. BELL   2,064,404
MOUNTING FOR VEHICLE WHEELS
Filed Jan. 30, 1935   6 Sheets-Sheet 6

SPRING FORCE

MOVEMENT OF WHEEL SUPPORT
RELATIVE TO VEHICLE FRAME

INVENTOR
Frank B. Bell
by Byrnes, Stebbins & Blenko
His Attys.

Patented Dec. 15, 1936

2,064,404

UNITED STATES PATENT OFFICE 2,064,404

MOUNTING FOR VEHICLE WHEELS

Frank B. Bell, Pittsburgh, Pa.

Application January 30, 1935, Serial No. 4,070

17 Claims. (Cl. 267—20)

This invention relates to mountings for vehicle wheels and is herein particularly described as applied to the individual springing of front wheels for automobiles.

The problem of springing an automotive vehicle so as to absorb road shocks and eliminate discomfort to the passengers resulting from such shocks, and from spring reactions, has occupied the attention of automotive engineers for years past, and a wide variety of schemes has been proposed. The present invention provides a system whereby the road shocks are very effectively absorbed or dissipated and, as hereinafter described in detail, a new and highly desirable "riding curve" is obtained.

Most of the devices heretofore proposed have failed to take into account or adequately to provide for the different conditions during normal riding on smooth roads, when the up and down movement of the wheel relative to the vehicle is quite small, and abnormal riding over rough roads when the relative movement is great. It is desirable to have relatively little resistance to small movements between the wheel and the vehicle and rapidly progressive increasing resistance to larger movements. I have found that these desirable results can be simply and inexpensively obtained by providing in combination with the frame of the vehicle and its relatively movable wheel supporting member, a shock absorbing spring, preferably of high capacity and short travel, so mounted that it exerts but a small force on small wheel movements, but exerts, on large wheel movements, a much larger force, greater in proportion to that exerted during small wheel movement, than would be obtained merely by a proportionate deflection of the spring. This is preferably accomplished by providing a link having one end operatively connected to the wheel-carrying member so as to be moved from a normal intermediate position in one direction or the other upon up or down movement of the wheel, while providing that the second end of the link shall move back and forth in a manner analogous to the cross-head of a crank-and-connecting-rod mechanism, and connecting the spring to the second end of the link. This combination brings about progressively increasing increments of movement of the second end of the link, and consequently of the shock absorbing spring, on successive equal increments of movement of the wheel relative to the vehicle, and therefore the shock absorbing spring is of relatively low effectiveness during small movements between the wheel and the vehicle, but is of rapidly increasing effectiveness upon large movements.

In the accompanying drawings illustrating certain preferred embodiments of the invention, Figure 1 is a front elevation, partly broken away and partly in section, showing one form of the invention;

Figure 1:
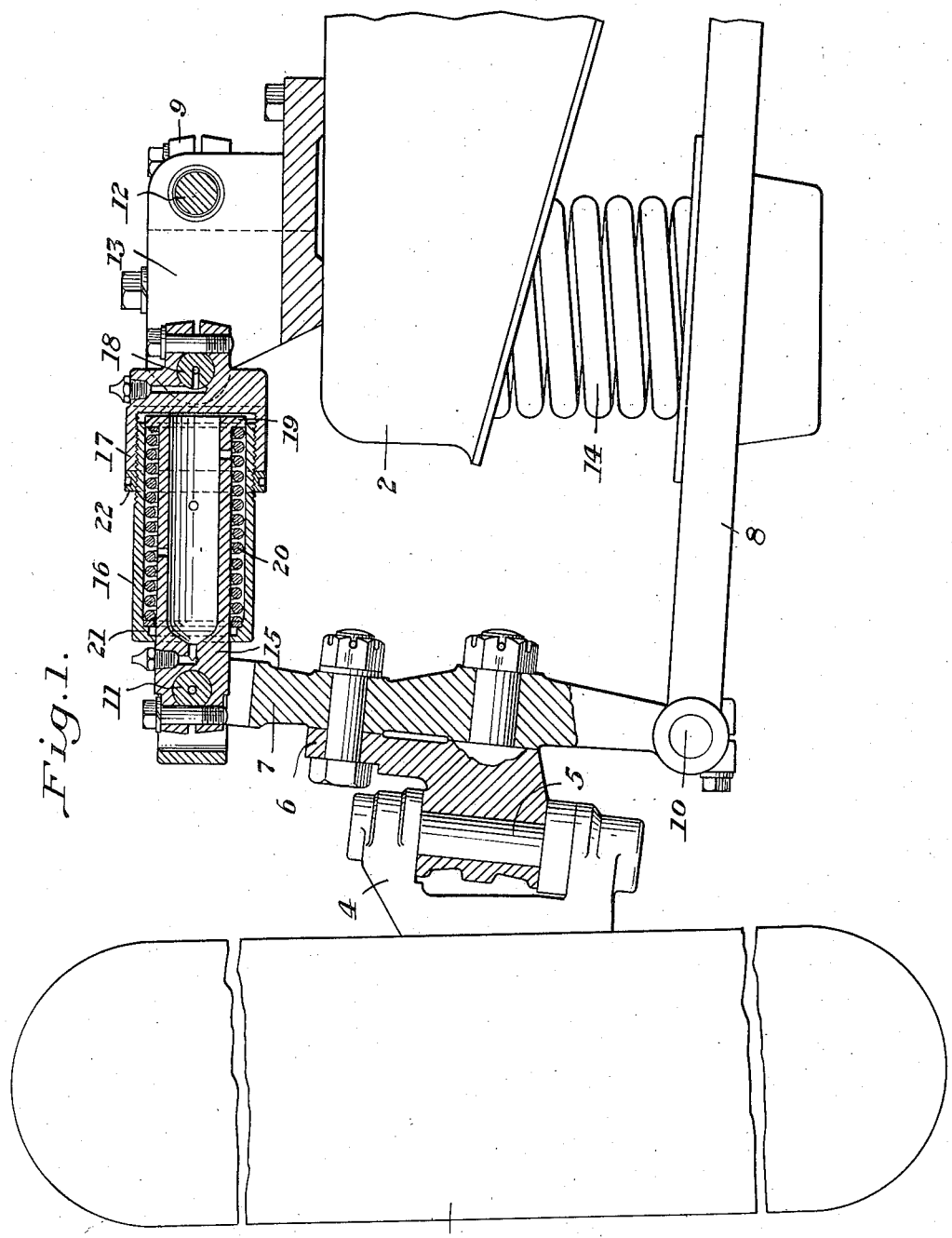
Figure 2:
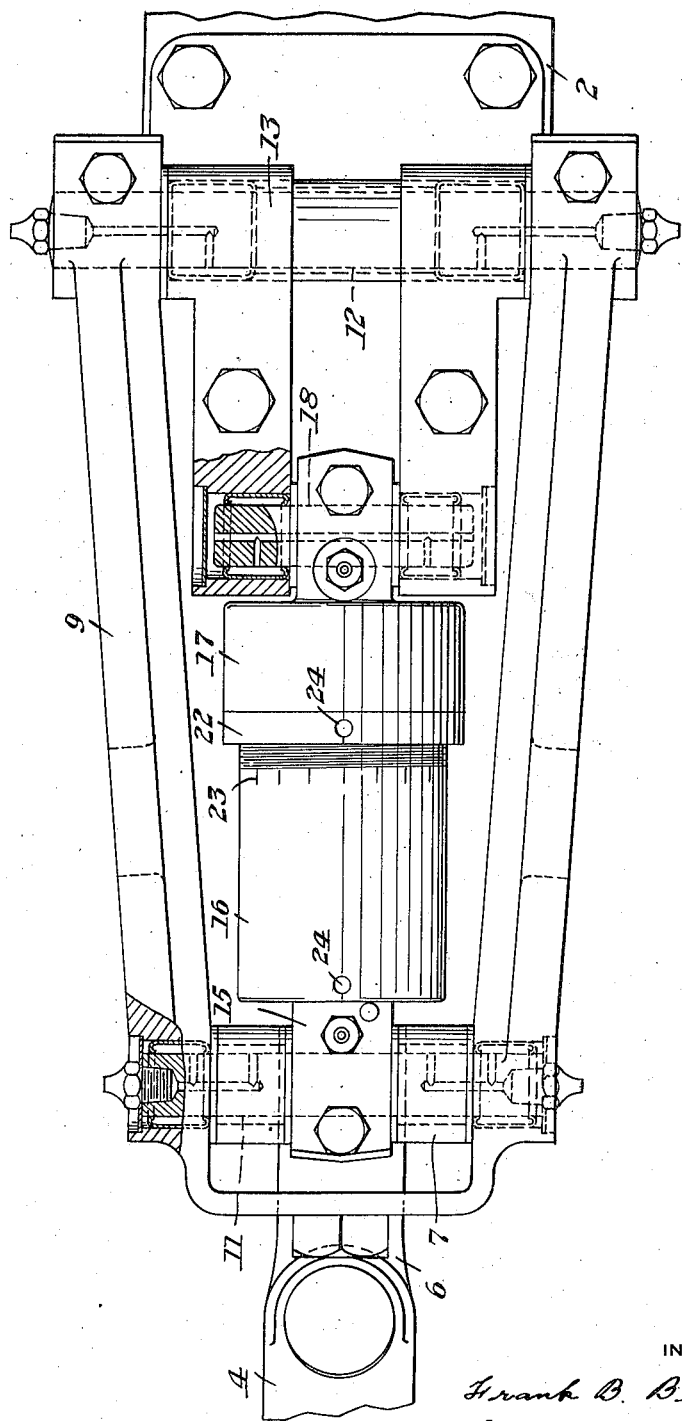
Figure 2 is a top plan view to enlarged scale of part of the mechanism shown in Figure 1.

Referring to Figures 1 and 2, there is shown a vehicle frame 2 having a supporting wheel 3 mounted on a spindle 4. The spindle is carried by a king pin 5 in a bracket 6 which, in turn, is carried by a wheel-supporting member 7. The wheel-supporting member is connected at top and bottom to the frame 2 by means of a lower link 8 and an upper link 9. The lower link is pivoted to the wheel-supporting member 7 at 10 and is pivoted to the frame at a point, not shown, near the center line of the vehicle. The upper link 9 is shorter than the lower link 8 and is U-shaped as shown in Figure 2. It is connected at its outer end to the wheel-supporting member 7 through a pivot pin 11. It is carried at its inner end on a pivot pin 12 mounted in a bracket 13 which is fastened to the frame 2. A load spring 14 is interposed between the frame 2 and the lower link 8. The mechanism so far described is old and well known. The load spring is under compression due to the weight of the vehicle and its passengers or other live load, and during movement along the road it moves up and down from the normal intermediate position. The action of the spring 14 is modified by my improved mechanism which will now be described.

The middle portion of the pin 11 carries a link 15 encased by a sleeve 16 which is threaded into a cap 17. The cap 17 is mounted on a pivot pin 18 carried in the bracket 13. The inner end of the link 15 is provided with a shoulder 19, and a coil spring 20, under initial compression, lies between the shoulder 19 and an inturned flange 21 at the outer end of the sleeve 16. As stated, the sleeve 16 is threaded in the cap 17 and a threaded locking ring 22 is also provided. The amount of initial compression of the spring 20 may be adjusted by loosening the locking ring 22 and threading the sleeve 16 into or out of the cap. Index marks 23 are provided to assist in making the adjustment, and holes 24 are provided in the sleeve and in the locking ring to receive capstan wrenches. A profound effect upon the mechanism may be had by this adjustment.

The axes of the pins 11, 18 and 12 all lie substantially in a straight line when the wheel supporting member 7 is in its normal intermediate position. It will be understood, of course, that this intermediate position is determined by the load in the vehicle and may vary slightly, but for practical purposes the mechanism may be so designed that the several pivot pins lie in a straight line when the vehicle is loaded in the amount which experience shows that it will normally carry. One great virtue of my apparatus is that variations in load either above or below the average will have practically no effect upon the functioning of the device.

Assuming that the axes of the three pivot pins initially lie in a straight line, the spring 20 will be compressed upon movement of the wheel-carrying member 7 either upwardly or downwardly from its normal intermediate position. This will best be understood by reference to Figure 3. Assuming that the wheel-carrying member 7 is moved upwardly, the axis of the pivot pin 11 describes an arc 25 having the axis of the pivot pin 12 as its center, the link 9 rocking clockwise as viewed in the drawings. The link 15 is also forced to move clockwise by reason of the upward movement of the pivot pin 11. Since the link 15 is carried by the sleeve 16 and the cap 17, it rotates about the axis of the pivot pin 18 as a center and its outer end tends to move in an arc 26 having the axis of the pin 18 as a center. However, it cannot move along such arc because of the link 9, and consequently the link 15 must slide outwardly in the sleeve 16 and further compress the spring 20. In this form of the invention the spring 20 assists the load spring 14 to restore the wheel-supporting member to its normal intermediate position. (As is hereinafter described, the spring may be advantageously arranged to function in opposition to the load spring.) The point to be noted at this time is that the amount of deformation of the spring 20 does not bear a straight line relationship to the amount of deformation of the load spring 14. On the contrary, the amount of deformation of the spring 20, on small movements of the wheel-supporting member 7 from its normal intermediate position, is very slight, but increases rapidly as the amplitude of such movements is increased. To illustrate this I have shown at $m_1, m_2 \ldots m_9$ equal increments of movement of the pivot pin 11 upwardly from its normal intermediate position. The link 15, for these successive positions, will lie in lines extending from points $m_1, m_2 \ldots m_9$ through the axis of the pin 18, and these lines will intersect the arc 26 at points $n_1, n_2 \ldots n_9$ as shown in the drawings. The distances $m_1n_1, m_2n_2, m_3n_3, \ldots m_9n_9$, represent the total outward movement of the link 15 for these successive positions, and hence the degree of added compression of the spring 20. Thus it will be seen that for equal increments of compression of the load spring 14 there will be progressively larger increments of movement of the spring 20, and consequently the restoring force exerted by the spring will be vastly greater as the amplitude of movement of the wheel-supporting member increases. The relationship above described results from the fact that the inner end of the link 15 moves in a fashion analogous to slider-crank motion.

Figure 4:
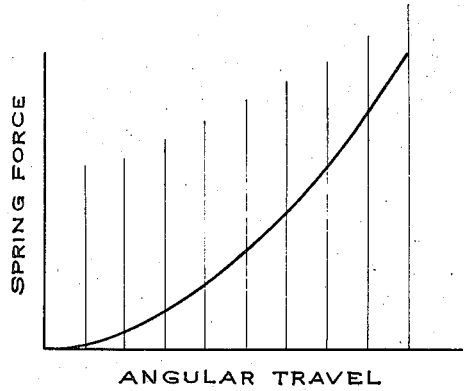
Figure 4 is a chart illustrating the increasing force applied by the shock absorbing spring upon progressive movement thereof.

Figure 4 shows how the force of the spring 20 increases very rapidly with the angular travel of the link 9. This increasing spring effect is of value in that the spring 20 does not markedly influence the movement of the wheel-supporting member 7 upon small movements thereof, but has a large and progressively marked influence upon large movements.

This situation is enhanced by another factor, namely, the effective distance at which the spring 20 acts to restore the parts to their normal intermediate position. As will be seen from Figure 3, the spring has an effective moment arm $a_9$ when the pin 11 is in the position $m_9$, through which arm it acts to restore the parts to the normal intermediate position. However, as is shown by the lines $a_9, a_8, a_7$ in Figure 3, this moment arm becomes progressively smaller and becomes zero at the intermediate position. It follows that the spring 20 can be of relatively small size and hence contained within a small compass without losing the desired effect.

Figure 3:
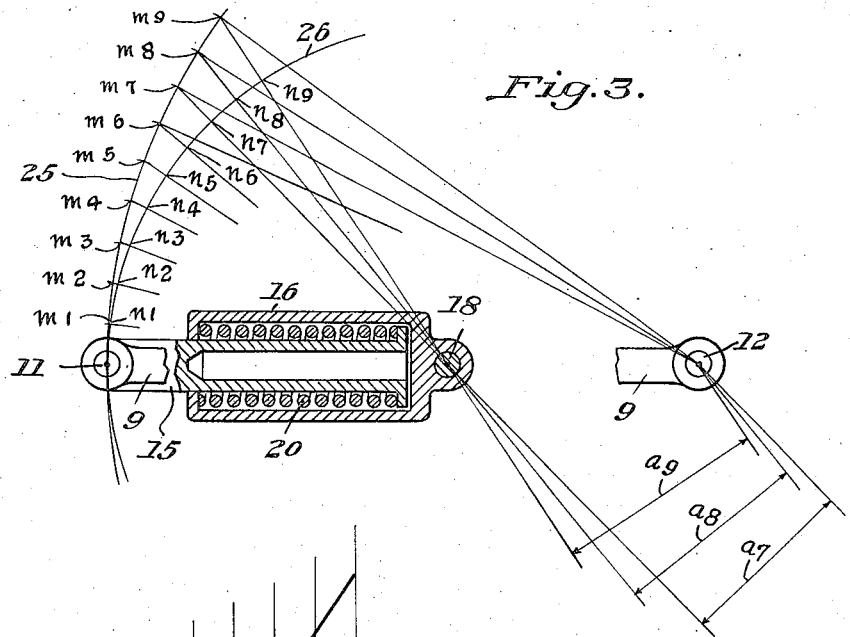
Figure 3 is a diagram illustrating the relationship of certain of the parts shown in Figures 1 and 2.

As will be clear from consideration of Figure 3, the operation of the apparatus will be the same if the pivot pin 11 is moved downwardly from its normal position, as would occur, for example, on a rebound or on striking a hole or low spot in the road. Regardless of whether the pin 11 moves upwardly or downwardly from its intermediate position, the spring 20 is compressed. This, of course, is on the assumption that the axes of the pins 11, 18 and 12 are originally in a straight line; but even if they do not lie in such a line, the small deflection of the spring and the inconsequentially small moment arm through which it acts until a substantial movement occurs combine to render the spring 20 substantially ineffective on small movements of the wheel-supporting member 7. Furthermore, the movement of the spring 20 increases at such a rate and its effective moment arm also increases at such a rate that for practical purposes the effect on the spring action is the same for a given deflection of the wheel supporting member, even though the normal intermediate position has been affected considerably by changes in the load carried by the car.

Figure 5:
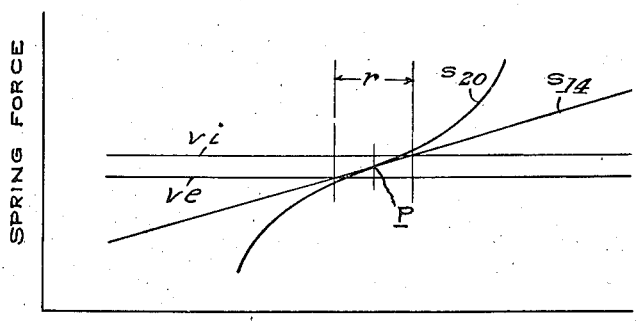
Figure 5 is a chart showing the combined effect of the load spring and the shock absorbing spring.

Figure 5 shows the combined effect of the load spring 14 and the modifying spring 20. The line $s_{14}$ shown on the chart shows the force exerted by the spring 14 at any position of the wheel-supporting member relative to the frame 2. Since the spring 14 is considered as a perfectly elastic helical spring, the line $s_{14}$ is a straight line. The line $s_{20}$ shows how the spring force is increased or diminished by the mechanism above described. I have indicated a point $p$ as corresponding to the normal intermediate position of the wheel-supporting member 7. This point is placed midway between a line $v_e$, representing the vehicle when empty, and $v_1$, representing the vehicle when loaded to its maximum capacity. It will be observed that over a distance $r$ extending on each side of the point $p$, corresponding to ordinary movements of the wheel-supporting member 7 relative to the frame 2, the action of the spring 14 is not materially modified. This is shown by the trivial departure of the line $s_{20}$ from the line $s_{14}$ over the normal riding range $r$. However, as we pass outside this range, the effect of the spring 20 becomes increasingly great and a corresponding shock absorbing action is obtained.

The relative spacing of the pivot pins 11, 18 and 12 has a marked effect upon the action of the shock absorber and hence upon the riding characteristics of the vehicle, and this fact may be utilized to advantage in designing the apparatus to meet different conditions. The riding characteristics may also be modified greatly by adjusting the initial compression of the spring 20. It should also be noted that the spring 20 serves materially to reduce or to eliminate rattles in the linkage by which the wheel-supporting member is attached to the frame.

Figure 6:
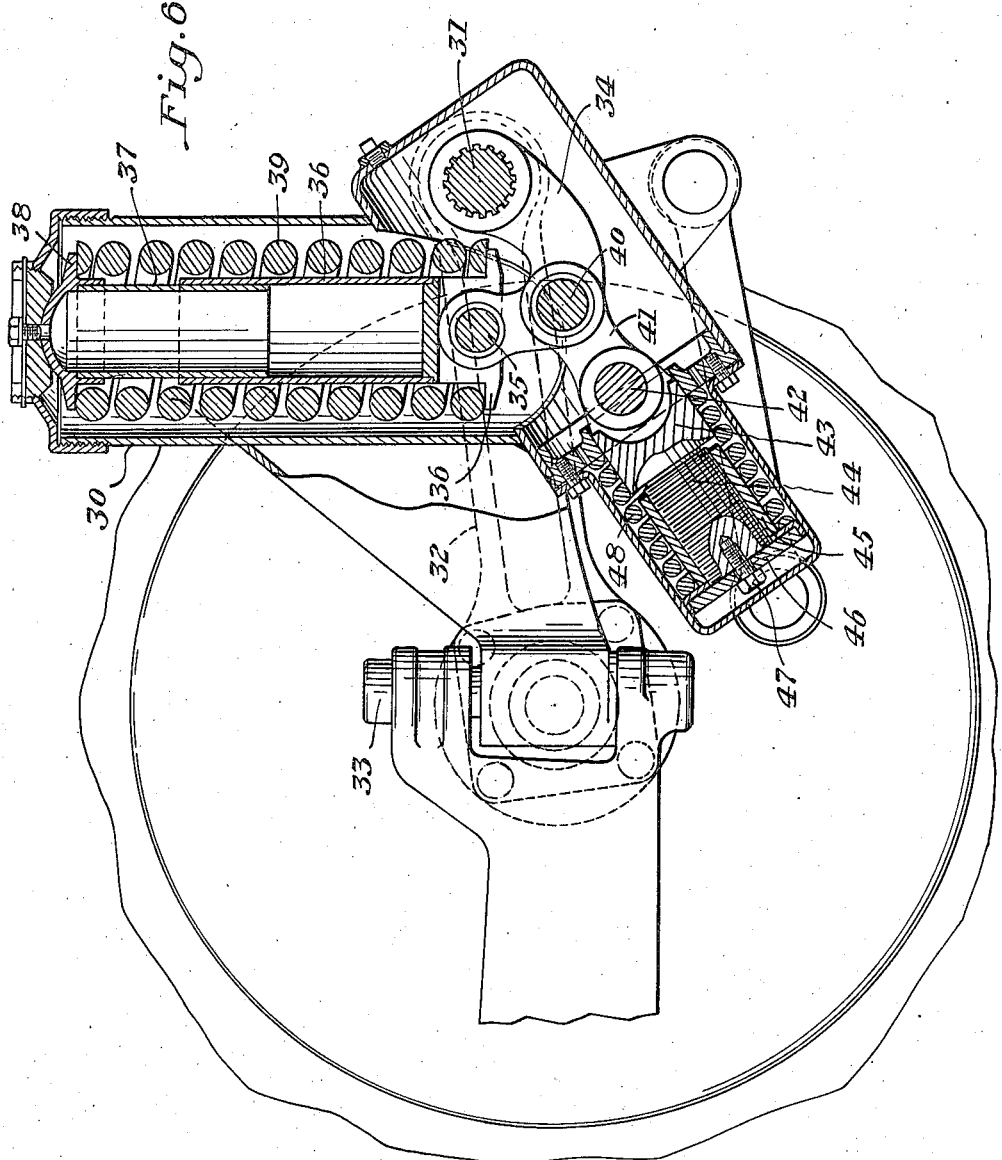
Figure 6 is a vertical longitudinal section through a modified form of the apparatus.

The modification illustrated in Figure 6 comprises a frame 30 carrying a rock shaft 31 having an arm 32 thereon which carries the wheel-supporting member 33. The rock shaft 31 also carries a lever 34 whose outer end engages a pivot pin 35 carried by a flanged sleeve 36. The sleeve 36 slides over a corresponding sleeve 37 having a flange 38 and the load spring 39 is interposed between the flanges of the two sleeves so as to resist upward movement of the arm 32. This apparatus is old and well known.

Intermediate its ends, the arm 34 carries a pivot pin 40 to which is connected a link 41 having its outer end connected by a pivot pin 42 to a slide 43. The slide 43 is threaded at 44 to receive an adjustable stop collar 45. A flange plate 46 is held in adjusted position against the stop collar by a screw 47 and a shock absorbing spring 48 is interposed between the plate 46 and a guide plate 49 constituting a part of the frame 30. The slide 43 is reciprocable in the guide plate 49.

The axes of the rock shaft 31, the pin 40 and the pin 42 all lie substantially in a straight line when the arm 32 is in its normal intermediate position, and therefore upon movement of the arm 32 either upwardly or downwardly from such position, the slide 43 will move inwardly toward the rock shaft 31 in slider-crank fashion. This movement will be opposed by the spring 48 and the principles set forth in respect of the embodiment of Figures 1 and 2 and more specifically illustrated in Figure 3 likewise apply here.

If desired, a resilient means other than the coil spring 20 or the coil spring 48 may be employed. I may, for example, use a friction spring of well-known type as shown, for example, in Harvey Patent 758,066, consisting of interengaging coils having co-acting tapered friction surfaces.

I may also use elastic means, either of the friction spring type or otherwise, biased so as either to resist or to assist movement of the wheel-supporting member from its normal intermediate position.

Figure 7:
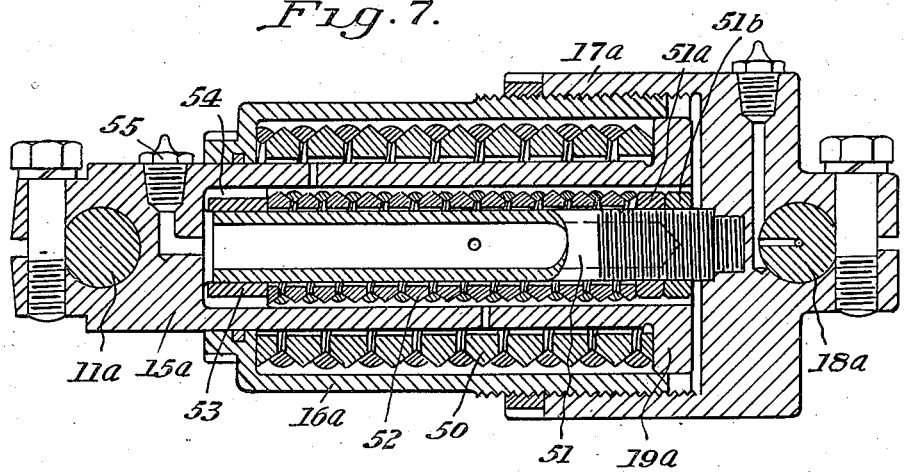
Figure 7 is a longitudinal section through a modified form of shock absorbing unit.

These several points are exemplified in Figure 7, which shows intermediate the pin 11, and the pin $18_a$ a link $15_a$ carried in a sleeve $16_a$ and a cap $17_a$. A friction spring 50 is placed between the shoulder $21_a$ and the flange $19_a$. This friction spring functions in a manner similar to the spring 20 except that upon re-expansion it delivers an amount of energy considerably less than that which it absorbed upon compression. This difference is due to friction between the several parts. This is described in greater detail below.

Figure 7 also shows a stud 51 carried by the cap $17_a$ and extending axially through the hollow central portion of the link $15_a$. A second friction spring 52 is placed around the stud 51. At its right-hand end it bears against a thrust ring $51_a$, and at its left-hand end it bears against a thimble 53 which is placed at the end of the axial recess of the link $15_a$. This thimble is slotted at 54 to permit the passage of lubricant supplied through a fitting 55 so that the friction spring 52 can be kept constantly lubricated. The thrust ring $51_a$ is threaded on the stud 51 and by adjusting it along the stud, the initial compression of the friction spring 52 may be adjusted as desired. The thrust ring $51_a$ is provided with a lock nut $51_b$.

The friction spring 52 is under high compression when the parts are in their normal intermediate positions, and it gives up energy upon movement of the parts from such position. In consequence it acts in opposition to the load spring 14, and where it is used in conjunction with another spring such as the spring 50 of Figure 7, in opposition to it as well. In certain cases the combined effect of springs acting in opposition on the link 15 may be embodied in a single spring, but where, as in the case of friction springs, there is the additional factor of friction upon re-expansion, it may be desirable in certain cases to employ two springs as shown because of the different frictional effects obtained from them.

Where there is used in conjunction with the link 15 (or with the link 41) a single spring acting in opposition to the load spring, the principles of operation as described in connection with Figure 3 still apply except that the direction of the force is reversed. One great virtue of a spring which acts in opposition to the load spring is that in the normal riding zone the "riding line" is very much flattened and, in consequence, an easier ride is obtained.

Figure 8:
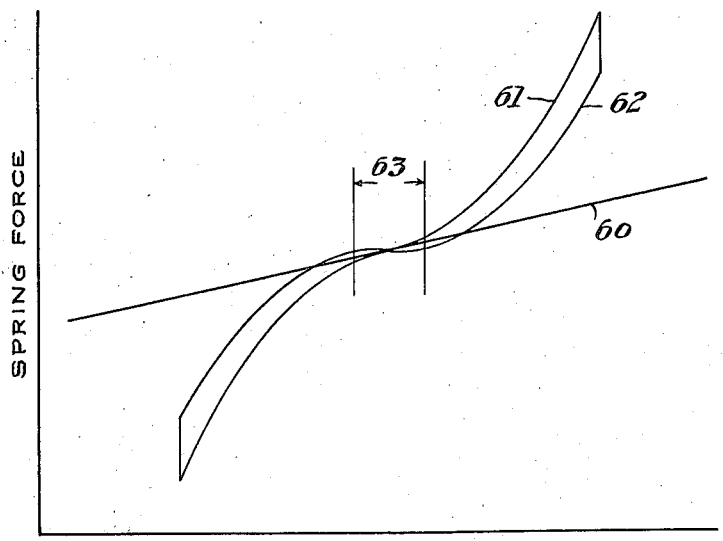
Figure 8 is a chart similar to Figure 5 but showing the relationship for a structure employing the modified form of shock absorber illustrated in Figure 7.

Figure 8 is a static diagram similar to Figure 5 for an apparatus embodying a friction spring. In this diagram the line 60 represents the load spring. The lines 61 and 62 show the riding line which is obtained by employing in conjunction with the load spring a friction spring which is biased to act in the same direction as the load spring. The line 61 represents the riding line when the friction spring is being compressed. The line 62 represents the riding line where the spring is permitted to expand after compression. The difference between the lines 61 and 62 is occasioned by the friction of the friction spring. It will be noted that the line 62 crosses the line 60 so that the riding line, especially in the zone 63, is very close to a horizontal line. This gives remarkably fine riding qualities. It may also be approximated by using a simple elastic spring biased in opposition to the load spring.

Figure 9:
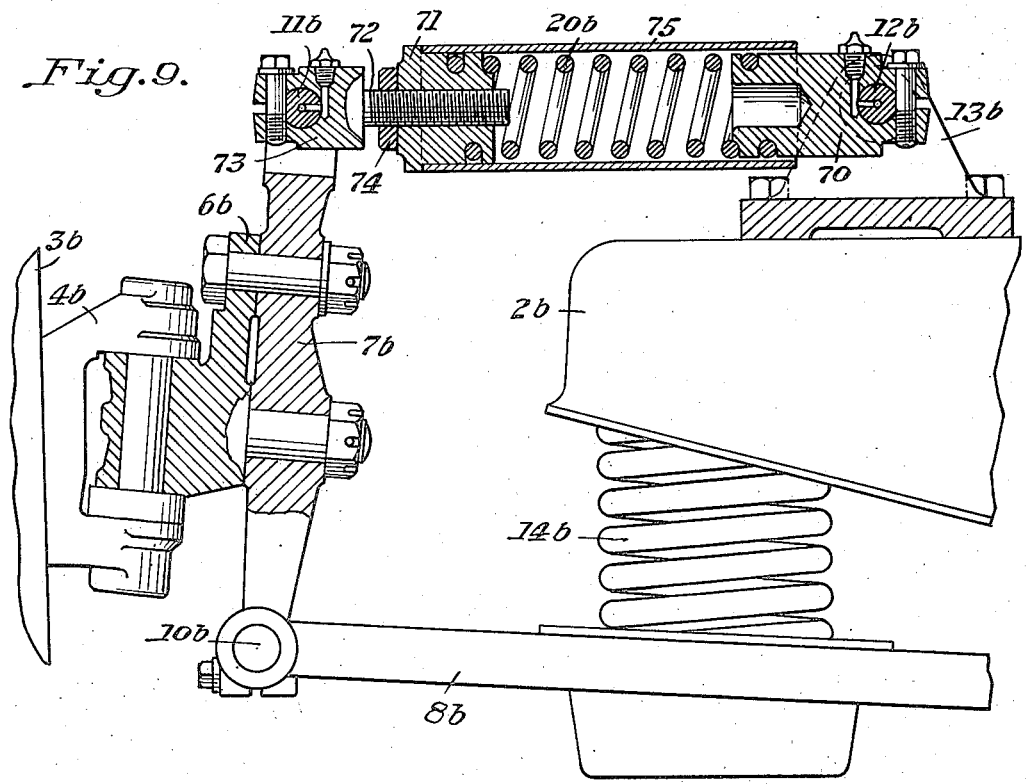
Figure 9 is a view similar to Figure 1, but showing another modification.

Figure 9 shows a modified apparatus in which the shock absorber spring $20_b$ is arranged to act in opposition to the load spring during the first part of an upward movement of the wheel-supporting member from its normal intermediate position and thereafter to assist such load spring. On downward movement of the wheel-supporting member from its normal intermediate position, the shock absorber spring 20b acts to assist the load spring during the first part of the movement and thereafter acts in opposition to the load spring. In this view, parts corresponding to similar parts of Figure 1 have been given the same reference character with a "b" suffixed thereto. The spring 20b, which should be of particularly high capacity in this case, has its ends secured, respectively, to a rocker 70 carried by the pivot pin 12b and a thimble 71. The thimble 71 is threaded on a stud portion 72 of a rocker 73 which is mounted on the shaft pin 11b. The initial compression of the spring may be adjusted by removing the pivot pin 11b, threading the stud 72 into or out of the thimble 71, and re-assembling the parts. A lock nut 74 is provided on the stud 72. The thimble 71 carries a sleeve 75 which extends over and protects the spring 20b. It fits slidingly over the rocker 70 and serves to protect the spring as well as to prevent undue sidewise deflections thereof. The free length of the spring 20b is greater than the length to which it is confined when the wheel-supporting member is in the normal intermediate position, but is less than the length to which it is extended on extreme upward or downward movement of the wheel-supporting member. In consequence, the spring which is originally under compression is first relieved of all such compression and is thereafter stretched. During moderate movements of the wheel-supporting member relative to the frame, the spring will remain in compression and it will only be upon larger movements of the wheel-supporting member, as, for example, when riding over rough roads, that it will be extended beyond its free length and put in tension.

Figure 10:
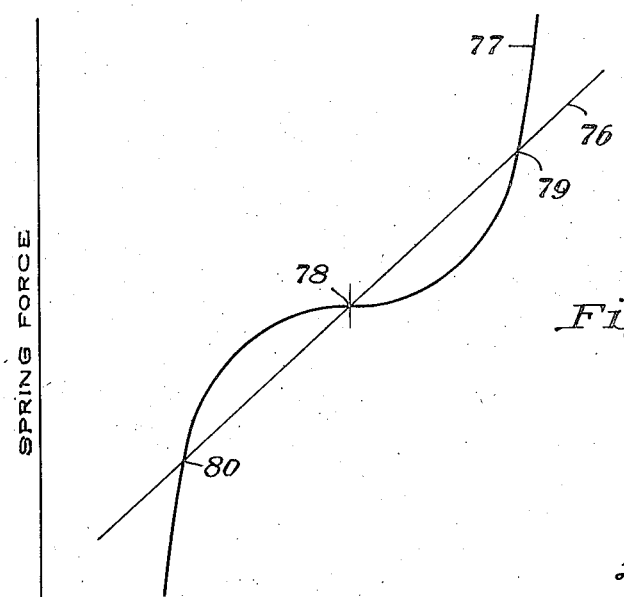
Figure 10 is a static load chart similar to Figure 5, but for the apparatus illustrated in Figure 9.

This combination gives particularly desirable riding qualities which are exemplified by Figure 10. In this figure the line 76 corresponds to the load spring 14b and the heavy curved line 77 shows the combined effect of the load spring 14b and the spring 20b. When the wheel-supporting member is at its normal intermediate position, the spring force is represented by the point 78 on the curve. It will be noted that for a considerable distance to either side of this point the curve is very flat because of the fact that the spring 20b is acting in opposition to or to assist the load spring dependent upon the direction of movement of the spring 20b from its normal intermediate position. As the wheel-supporting member continues to move upwardly from its normal intermediate position, the effective moment arm through which the spring 20b acts will become increasingly greater, but the force of expansion of the spring rapidly diminishes as it approaches its free length, so that a point is reached when momentarily the spring 20b is exerting no force in either direction. This corresponds to the point 79 of Figure 10 where the curve 77 intersects the line 76. Continued upward movement of the wheel-supporting member from its normal intermediate position puts the spring 20b in tension. In this state it aids the load spring 14b, and the combined effect is shown by that portion of the curve 77 above the point of intersection 79. The same situation applies if the wheel-supporting member moves downwardly from the normal intermediate position except that the spring 20b first acts to assist the load spring 14b and then to act in opposition to it, the point where the spring 20b is exerting no force in either direction being represented by the intersection 80. This type of curve is, as stated, highly desirable because it gives an exceedingly "soft" ride for all moderate movements of the wheel-supporting member relative to the frame, yet the shock absorbing mechanism becomes very effective on extreme movements of the wheel-supporting member and provides adequate force to check such movements and absorbs the shocks accompanying them.

One highly important advantage of my invention is that it permits of using a shock absorbing spring of high capacity and short travel. Such a spring is adequate to provide the high resistance demanded upon extreme movements of the wheel-carrying member relative to the frame; but by reason of the manner in which I apply the power of such spring to the wheel-carrying member it is substantially ineffective at or near the normal intermediate position and hence despite its high capacity does not in any way detract from the easy riding qualities of the car during moderate amounts of movement of the wheel-carrying member relative to the frame.

Another advantage of my invention is that the highly desirable results above described are obtained by a relatively simple mechanism consisting primarily of linked members and without the use of cams, rollers and other mechanism which have been shown by experience to be undesirable for the service to which mechanism of this sort is subjected.

Another advantage of my invention, especially marked where springs of the friction type are employed, is that sidesway of the vehicle when traveling around a curve may be greatly reduced.

While I have illustrated and described present preferred embodiments of the invention, it will be understood that it is not limited to the forms shown, but may be otherwise embodied or practiced within the scope of the following claims.

I claim:

1. A vehicle wheel mounting comprising a frame, a relatively movable wheel-supporting member carried thereby, an arm rockable on such movement in one direction or the other from a normal intermediate position depending on the direction of movement of the wheel carrying member relative to the frame, a link having a normal intermediate position in the plane of such arm and having its first end movable to one side or the other of such plane upon corresponding movement of the arm, the second end of the link being movable back and forth in slider-crank fashion, and resilient means operatively connected to the second end of the link.

2. A vehicle wheel mounting comprising a frame, a relatively movable wheel-supporting member carried thereby, a load spring biasing the wheel-supporting member against weight from the frame and adapted to expand or contract as the wheel-supporting member moves from its normal intermediate position, rockable means rockable relative to said frame and operably connected to the wheel-supporting member, and resilient means connected adjacent one end to said rockable means and normally extending substantially at right angles to the direction of movement of said connection of resilient means and rockable means, the resilient means acting to assist the action of the load spring during at least a part of the movement of the rockable means relative to the frame.

3. A vehicle wheel mounting comprising a frame, a relatively movable wheel-supporting member carried thereby, a load spring biasing the wheel-supporting member against weight from the frame and adapted to expand or contract as the wheel-supporting member moves from its normal intermediate position, rockable means pivoted to the frame and operably connected to the wheel-supporting member, and resilient means connected adjacent one end to said rockable means and normally extending substantially at right angles to the direction of movement of said connection of resilient means and rockable means, the resilient means acting to assist the action of the load spring during at least a part of the movement of the rockable means relative to the frame.

4. A vehicle wheel mounting comprising a frame, a relatively movable wheel-supporting member carried thereby, a load spring biasing the wheel-supporting member against weight from the frame and adapted to expand or contract as the wheel-supporting member moves from its normal intermediate position, rockable means rockable relative to the frame and operably connected to the wheel-supporting member, and resilient means having one end fixed relative to the frame and the other end connected to the rockable means, the resilient means normally extending at substantially right angles to the direction of movement of the connection between the resilient means and rockable means, the resilient means acting to assist the action of the load spring during at least a part of the movement of the rockable means relative to the frame.

5. A vehicle wheel mounting comprising a frame, a relatively movable wheel-supporting member carried thereby, a load spring biasing the wheel-supporting member against weight from the frame and adapted to expand or contract as the wheel-supporting member moves from its normal intermediate position, rockable means rockable relative to the frame and operably connected to the wheel-supporting member, and resilient means having one end connected to the frame and the other end connected to the rockable means, the resilient means normally extending at substantially right angles to the direction of movement of the connection between the resilient means and rockable means, the resilient means acting to assist the action of the load spring during at least a part of the movement of the rockable means relative to the frame.

6. A vehicle wheel mounting comprising a frame, a relatively movable wheel-supporting member carried thereby, a load spring biasing the wheel-supporting member against weight from the frame and adapted to expand or contract as the wheel-supporting member moves from its normal intermediate position, rockable means rockable relative to the frame and operably connected to the wheel-supporting member, and resilient means connected adjacent one end to the rockable means, the resilient means and rockable means normally extending in substantially the same plane extending at right angles to the direction of movement of the connection between the resilient means and rockable means, the resilient means acting to assist the action of the load spring during at least a part of the movement of the rockable means relative to the frame.

7. A vehicle wheel mounting comprising a frame, a relatively movable wheel-supporting member carried thereby, a load spring biasing the wheel-supporting member against weight from the frame and adapted to expand or contract as the wheel-supporting member moves from its normal intermediate position, rockable means pivoted to the frame and to the wheel-supporting member, and resilient means connected to the frame and to the wheel-supporting member, the point of connection of the resilient means and frame normally lying substantially in the horizontal plane extending between the points of connection of the rockable means with the frame and with the wheel-supporting member, the resilient means acting to assist the action of the load spring during at least a part of the movement of the rockable means relative to the frame.

8. A vehicle wheel mounting comprising a frame, a relatively movable wheel-supporting member carried thereby, a load spring biasing the wheel-supporting member against weight from the frame and adapted to expand or contract as the wheel-supporting member moves from its normal intermediate position, resilient means pivoted to the wheel-supporting member and to the frame, and means for moving the pivot of the wheel-supporting member and resilient means in an arc of a circle having a radius different from the distance between the pivot points of the resilient means when the resilient means is in its normal position, whereby the rate of change in length of the resilient means increases as the pivot point is displaced from its normal position, the resilient means acting to assist the action of the load spring during at least a part of the movement of the rockable means relative to the frame.

9. A vehicle wheel mounting comprising a frame, a relatively movable wheel-supporting member carried thereby, a load spring biasing the wheel-supporting member against weight from the frame and adapted to expand or contract as the wheel-supporting member moves from its normal intermediate position, resilient means pivoted to the wheel-supporting member and frame and rockable relative to the frame, rockable means pivoted to the frame and to the wheel-supporting member, the pivot of the rockable means and resilient means being rockable in an arc of a circle having a radius different from the distance between the pivot points of the resilient means when the resilient means is in its normal position, whereby the rate of change in length of the resilient means increases as the pivot point is displaced from its normal position, the resilient means acting to assist the action of the load spring during at least a part of the movement of the rockable means relative to the frame.

10. A vehicle wheel mounting comprising a frame, a relatively movable wheel-supporting member carried thereby, a load spring biasing the wheel-supporting member against weight from the frame, and a shock absorbing spring operatively connected to the wheel-supporting member, the shock absorbing spring being so biased and arranged that it first opposes and then assists the load spring as the shock absorbing spring is moved in one direction from its normal intermediate position, and first assists and then opposes the load spring as the shock absorbing spring is moved in the opposite direction from its normal intermediate position.

11. A vehicle wheel mounting comprising a frame, a relatively movable wheel-supporting member carried thereby, and a spring operatively connected to the wheel-supporting member, the spring being so biased and arranged that as it is moved from its normal position as the wheel-supporting member moves relative to the frame it aids such relative movement first with increasing and then with decreasing force until such force becomes zero and thereafter the spring is biased in the opposite direction and resists such relative movement and with increasing force.

12. A vehicle wheel mounting comprising a frame, a relatively movable wheel-supporting member carried thereby, a load spring biasing the wheel-supporting member against weight from the frame, and a shock absorbing spring connected adjacent one end to the wheel-supporting member and having its other end fixed relative to the frame, the shock absorbing spring acting to assist the action of the load spring during at least a part of the movement of the wheel-supporting member relative to the frame.

13. A vehicle wheel mounting comprising a frame, a wheel-supporting member, a pair of spaced links pivoted at spaced points to the frame and at spaced points to the wheel-supporting member, and resilient means operatively connected in a pivotal manner to the wheel-supporting member and frame in such manner that the pivot of the resilient means and wheel-supporting member moves in an arc of a circle having a radius different from the distance between the pivot points of the resilient means when the resilient means is in its normal intermediate position, whereby the rate of change in length of the resilient means increases as it moves from its normal intermediate position.

14. A vehicle wheel mounting comprising a frame, a wheel-supporting member, a pair of spaced links pivoted at spaced points to the frame and at spaced points to the wheel-supporting member, a load spring biasing the wheel-supporting member against weight from the frame, and resilient means operatively connected in a pivotal manner to the wheel-supporting member and frame in such manner that the pivot of the resilient means and wheel-supporting member moves in an arc of a circle having a radius different from the distance between the pivot points of the resilient means when the resilient means is in its normal intermediate position, whereby the rate of change in length of the resilient means increases as it moves from its normal intermediate position.

15. A vehicle wheel mounting comprising a frame, a wheel-supporting member, a pair of spaced links pivoted at spaced points to the frame and at spaced points to the wheel-supporting member, resilient means associated with one of the links and operatively connected in a pivotal manner to the wheel-supporting member and frame, the distance between the pivots of the link with which the resilient means is associated being different from the distance between the pivots of the resilient means when the resilient means is in its normal intermediate position, whereby the rate of change in length of the resilient means increases as it moves from its normal intermediate position.

16. A vehicle wheel mounting comprising a frame, a wheel-supporting member, a pair of spaced links pivoted at spaced points to the frame and at spaced points to the wheel-supporting member, and resilient means operatively connected in a pivotal manner to the wheel-supporting member and frame in such manner that the pivot of the resilient means and wheel-supporting member moves in an arc of a circle having a radius different from the distance between the pivot points of the resilient means when the resilient means is in its normal intermediate position, whereby the rate of change in length of the resilient means increases as it moves from its normal intermediate position, the resilient means normally extending at right angles to the line of movement of its pivot point with the wheel-supporting member.

17. A vehicle wheel mounting comprising a frame, a wheel-supporting member, a pair of spaced links pivoted at spaced points to the frame and at spaced points to the wheel-supporting member, a load spring biasing the wheel-supporting member against weight from the frame, and resilient means associated with one of the links and operatively connected in a pivotal manner to the wheel-supporting member and frame, the distance between the pivots of the link with which the resilient means is associated being different from the distance between the pivots of the resilient means when the resilient means is in its normal intermediate position, whereby the rate of change in length of the resilient means increases as it moves from its normal intermediate position.

FRANK B. BELL.